July 14, 1964 W. SEUFERT ETAL 3,140,511
METHOD OF AND A DEVICE FOR GRANULATING A PLASTIC MATERIAL
Filed Feb. 14, 1963

INVENTORS
WILHELM SEUFERT
RUDOLF FRITSCH

By Hane and Nydick
ATTORNEYS

United States Patent Office 3,140,511
Patented July 14, 1964

3,140,511
METHOD OF AND A DEVICE FOR GRANULATING A PLASTIC MATERIAL
Wilhelm Seufert, Korntal, near Stuttgart, and Rudolf Fritsch, Stuttgart-Feuerbach, Germany, assignors to Werner & Pfleiderer, Stuttgart-Feuerbach, Germany, a firm of Germany
Filed Feb. 14, 1963, Ser. No. 258,516
Claims priority, application Germany Apr. 28, 1962
7 Claims. (Cl. 18—1)

The present invention relates to a device for producing granulated material from a pliable starting material, especially from plastics in pliable condition.

There are known devices for producing granulated material by first forming strands of the starting material by means of two oppositely rotating peripherally grooved rollers disposed close to each other in axially staggered relationship, and then transversely cutting the strands formed between the rollers into small pieces. Experience shows that in devices of this kind bands or films tend to form between the strands whereby the same are held together so that the plastic material emerging from the rollers is not in the desired form of separate and individual strands but in the form of ribbons having lengthwise parallel ribs. Obviously, transverse cuttings of such ribbons do not result in the desired granulated material but in short sections of the ribbon. The tendency to form such ribbon-like structures instead of separate strands is particularly marked when the plastic material to be granulated has a strongly cohesive rubber-like consistency.

It is a broad object of the invention to provide a novel and improved device for producing granulated material, which method and device eliminate the aforedescribed formation of ribbon-like structures instead of separate strands so that the desired granulated material can be readily and reliably obtained by cutting the strands into small pieces.

A specific object of the invention is to provide granulating means of the general kind above referred to which prevent the formation of bands or films joining the strands ab initio, or at least immediately destroy any bands or films that may be formed.

Another specific object of the invention is to provide a novel and improved device of the general kind above referred to which includes means retaining successive strand portions as the same are formed in the grooves of the forming rollers until the strands reach the cutting means of the device. These cutting means are located spaced apart from the peripheral zone between the rollers where the strands are formed, thus doubling the transverse spacing between adjacent strands in reference to the spacing at said zone, thereby correspondingly reducing the possibility of the presence of joining bands or films at the time the strands are cut.

A further specific object of the invention is to provide a novel and improved device in which auxiliary cutting means are provided closely adjacent to said zone to cut apart any bands or films that may be present just when the peripheral surfaces of the rollers begin to move away from each other and toward the cutting means of the device.

A still further specific object of the invention is to provide a novel and improved device of the general kind above referred to in which stripper means strip successive strand portions out of the roller grooves just before such portions reach the cutting means of the device thus assuring that the successive strand portions are completely cut through by the cutting means.

Other and further objects, features and advantages of the invention will be pointed out hereinafter and set forth in the appended claims constituting part of the application.

In the accompanying drawing several embodiments of the invention are shown by way of illustration and not by way of limitation.

Figure 1:
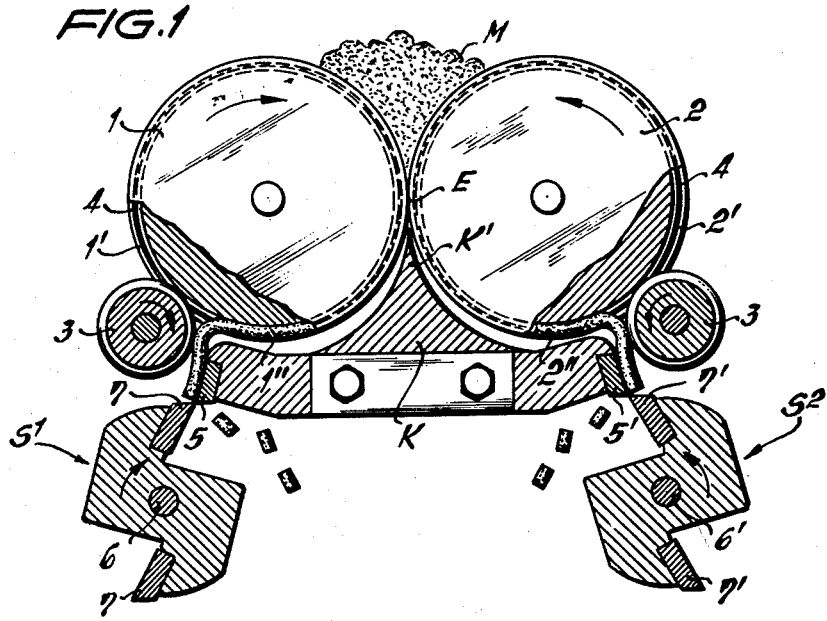
FIG. 1 is a sectional, elevational view of a device for producing granulated material in accordance with the invention.
Figure 2:
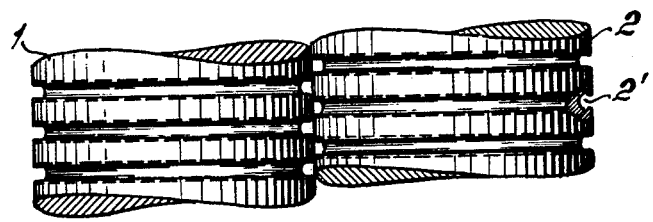
FIG. 2 is a fragmentary plan view of FIG. 1 showing the strand-forming rollers of the device.
Figure 4:
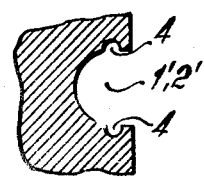
FIG. 4 is a fragmentary cross-section of the type of rollers used in the device according to the FIGS. 1 and 2 on an enlarged scale.

Referring first to FIGS. 1, 2 and 4 in detail, the device of the invention as exemplified in the drawing comprises a pair of rollers 1 and 2 of any desired length. The rollers are parallel to each other and rotated by any suitable drive means in opposite directions as indicated by the arrows. The peripheral surface of the rollers includes a plurality of axially spaced circumferential grooves 1' and 2' respectively. The grooves have a cross-section such that the maximum width of the grooves is greater than the width of the grooves at the mouth thereof. This may be effected as can be seen in FIG. 4 by providing narrow circumferential auxiliary grooves 4 in the side walls of the main groove.

Figure 3:
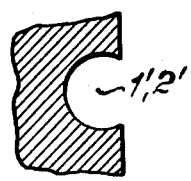
FIG. 3 is a fragmentary cross-section of a modification of the rollers.
Figure 5:
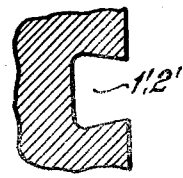
FIG. 5 is a fragmentary cross-section of another modification of the rollers.

According to the modification of FIG. 3 the same effect is obtained by cutting a generally circular groove so deeply into the roller surface that the width of the groove at the mount thereof is less than the diameter of the groove. In FIG. 5 the grooves are undercut to obtain the same result. Each of the cross-sectional configurations of the grooves, as shown in FIGS. 3, 4 and 5, will tend to retain a strand formed in the groove, or in other words a certain though moderate force must be used to remove strands formed in the grooves from the same. Cross-sectional shapes of the grooves other than those here illustrated which serve the same purpose can be readily visualized.

As can best be seen in FIG. 2, the grooves in rollers 1 and 2 are staggered so that one groove in one roller always faces a landing between two grooves on the other rollers, that is, a substantially closed forming space is provided in the zone or forming gap E of the device in which rollers 1 and 2 just touch each other, or are at least very close to each other.

Strands are produced by feeding a supply of a plastic mass M of suitable consistency between the rollers from the top side thereof. Automatic feeding means suitable for the purpose are well known; they do not constitute part of the invention and are hence not shown in detail. As the plastic material is pulled between the two rollers, strands 1" and 2" are formed in each groove and the strands are retained in the grooves due to the aforedescribed specific configuration of the grooves as the peripheral surfaces of the rollers become separated from each other. The strands are carried to a stripper means 2 disposed spaced apart from the forming zone E. The stripper means are shown in the form of disks or narrow rollers 3 which protrude into the forming grooves and are rotated opposite to the rotational direction of rollers 1 and 2, as is indicated by arrows.

The strands forced out of the grooves of each roller and bent off, as shown in FIG. 1, are cut into many small sections or pieces by cutters S1 and S2. These cutters which may be of any suitable design, are shown as comprising cutter blades 7 rotating about a driven shaft 6 in the direction indicated by an arrow.

As it is evident from FIG. 2, two strands, one being formed in a groove of one roller and the other in a groove of the other roller are separated from each other lengthwise of the rollers only by half the axial spacing of the grooves in each roller when and while the strands are still within the forming zone E. However, as the strands leave the forming zone and the respective peripheral surface portions of one roller move away from the corresponding peripheral surface portions of the other roller, each two adjacent strands are separated from each other by an axial distance twice the distance by which the two adjacent strands were separated in the forming zone E due to the nearness of the peripheral surfaces of the two rollers in that zone. As a result there is practically no tendency to form films or bands bridging the strands. Any rudimentary bands that may form will be torn apart when the strands on the two rollers begin to separate, partly due to the retention of the strands in the grooves by the undercut grooves and partly due to the increase in the axial separation of the strands.

To assure further a clean and complete separation of the strands from each other, auxiliary cutting means K are provided adjacent to the forming zone E. The cutting means are shown as comprising a narrow cutting wedge K′ which protrudes deeply between rollers 1 and 2 as closely as practical to the forming zone E. As it is evident, if there should be any adhesions between the strands formed in the two rollers such adhesions will be cut apart by edge K′ before strand portions can be pulled out of the grooves as the just formed strand portions move toward the stripper means and the cutter. The provision of an auxiliary cutter is particularly advisable when the plastic material to be granulated has a strong cohesion.

While the wedge shape shown in FIG. 1 was found to be advantageous, the cutting edge of cutter K may of course take various other shapes, provided only that it is capable of destroying closely to the forming zone E any bands between the strands on the two rollers which may form, for instance a cutting wire is often suitable.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A device for producing granulated material from a plastic mass, said device comprising a pair of oppositely rotatable parallel rollers having parallel circumferential forming grooves in their peripheral walls, said rollers being mounted close to each other and axially staggered so that landings between the grooves in one roller face the grooves in the other roller, thereby providing a grooved forming gap between the rollers for forming in the grooves of each roller strands from plastic mass fed between the rollers, said grooves having a mouth narrower than the maximum width of the grooves to restrain the strands within the grooves for part of each revolution of the rollers, and cutting means stationarily mounted spaced apart from said forming gap for transversely cutting the strands formed in the grooves into a multitude of short sections.

2. A device according to claim 1 wherein each of said grooves has a cross-sectional configuration undercut in reference to the width of the mouth of the respective groove.

3. A device according to claim 1 wherein each of said grooves has in opposite side wall portion lengthwise extending recesses to enlarge the width of the groove at said recesses in comparison with the width of the mouth of the groove.

4. A device according to claim 1 and comprising an auxiliary cutting means mounted closely adjacent to the forming gap and extending along the length thereof for cutting apart any parts of the plastic mass that may tend to bridge strands in the grooves of one roller and strands in the grooves of the other roller.

5. A device according to claim 4 wherein said auxiliary cutting means is in the form of a cutting wedge protruding into the forming gap.

6. A device according to claim 1 and comprising stripping means for stripping successive strand portions out of said grooves prior to said strand portions reaching said cutting means.

7. A device according to claim 6 wherein said stripping means comprise two sets of stripper disks, one for each roller and rotatable in a direction opposite to the rotational direction of the respective roller, each disk in either set engaging a respective roller groove to force out successive strand portions therein.

References Cited in the file of this patent

UNITED STATES PATENTS

| | | |
|---|---|---|
| 2,287,087 | Clausen et al. | June 23, 1942 |
| 2,464,746 | Gering | Mar. 15, 1949 |
| 2,508,414 | Meyer | May 23, 1950 |
| 2,917,821 | Fritsch | Dec. 22, 1959 |
| 2,964,785 | Young | Dec. 20, 1960 |
| 2,965,920 | Whittum | Dec. 27, 1960 |
| 3,076,999 | Washburn | Feb. 12, 1963 |